United States Patent
Yan

(10) Patent No.: US 11,983,069 B2
(45) Date of Patent: May 14, 2024

(54) DATA REBUILDING METHOD, MEMORY STORAGE APPARATUS, AND MEMORY CONTROL CIRCUIT UNIT

(71) Applicant: PHISON ELECTRONICS CORP., Miaoli (TW)

(72) Inventor: Horng-Sheng Yan, Penghu County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 61 days.

(21) Appl. No.: 17/386,547

(22) Filed: Jul. 28, 2021

(65) Prior Publication Data

US 2022/0398155 A1 Dec. 15, 2022

(30) Foreign Application Priority Data

Jun. 11, 2021 (TW) .................. 110121429

(51) Int. Cl.
*G11C 29/00* (2006.01)
*G06F 11/10* (2006.01)
*G06F 13/16* (2006.01)
*G06F 13/42* (2006.01)

(52) U.S. Cl.
CPC ...... *G06F 11/1076* (2013.01); *G06F 13/1668* (2013.01); *G06F 13/4282* (2013.01); *G06F 2213/0026* (2013.01)

(58) Field of Classification Search
CPC ............. G06F 11/1076; G06F 13/1668; G06F 13/4282; G06F 2213/0026
See application file for complete search history.

(56) References Cited

U.S. PATENT DOCUMENTS

| 2018/0113761 A1 | 4/2018 | Ko et al. |
| 2020/0026464 A1* | 1/2020 | Yen ...................... G06F 12/1009 |
| 2020/0151055 A1* | 5/2020 | Eom ...................... G06F 3/0619 |

FOREIGN PATENT DOCUMENTS

| CN | 111880749 | 11/2020 |
| TW | 201124840 | 7/2011 |

OTHER PUBLICATIONS

"Office Action of Taiwan Counterpart Application", issued on May 13, 2022, p. 1-p. 5.
"Office Action of China Counterpart Application", issued on Mar. 23, 2023, p.1-p. 17.

* cited by examiner

*Primary Examiner* — Samir W Rizk
(74) *Attorney, Agent, or Firm* — JCIPRNET

(57) ABSTRACT

A data rebuilding method, a memory storage apparatus, and a memory control circuit unit are disclosed. The method includes: establishing a connection between the memory storage apparatus and a host system; storing a first data to a memory of the host system via the connection; detecting an error in the first data in the memory; and rebuilding a part of data in the first data in the memory according to the error.

24 Claims, 10 Drawing Sheets

DATA REBUILDING METHOD, MEMORY STORAGE APPARATUS, AND MEMORY CONTROL CIRCUIT UNIT

CROSS-REFERENCE TO RELATED APPLICATION

This application claims the priority benefit of Taiwan application serial no. 110121429, filed on Jun. 11, 2021. The entirety of the above-mentioned patent application is hereby incorporated by reference herein and made a part of this specification.

BACKGROUND OF THE INVENTION

Technology Field

The invention relates to a data rebuilding technique in a memory, and more particularly relates to a data rebuilding method, a memory storage apparatus, and a memory control circuit unit.

Description of Related Art

Portable electronic devices such as mobile phones and notebook computers have grown rapidly in the past few years, which has led to a rapid increase in consumer demand for storage media. Since a rewritable non-volatile memory module (such as a flash memory) has characteristics such as data non-volatility, power-saving, small size, and no mechanical structures, the rewritable non-volatile memory module is very suitable to be built into the various portable electronic devices provided above.

Certain types of memory storage apparatus support host memory buffering techniques. In an architecture using host memory buffering, the memory storage apparatus may use the memory of the host system as the buffer of the memory storage apparatus, and may actively access data to the memory of the host system. For example, when the host system reads data from the memory storage apparatus or writes data to the memory storage apparatus, the management table needed to access the memory storage apparatus may be temporarily stored in the memory of the host system for the memory storage apparatus to query or update the data content therein at any time. However, when an error occurs in the data stored in the memory of the host system, the data access behavior of the memory storage apparatus is also affected, and even read or write error may occur.

SUMMARY

The invention provides a data rebuilding method, a memory storage apparatus, and a memory control circuit unit that may improve the fault tolerance of the memory storage apparatus to a shared memory in a host system.

An exemplary embodiment of the invention provides a data rebuilding method used in a memory storage apparatus. The method includes: establishing a connection between the memory storage apparatus and a host system; storing a first data to a memory of the host system via the connection; detecting an error in the first data in the memory; and rebuilding a part of data in the first data in the memory according to the error.

An exemplary embodiment of the invention further provides a memory storage apparatus including a connection interface unit, a rewritable non-volatile memory module, and a memory control circuit unit. The connection interface unit is configured to be coupled to a host system. The memory control circuit unit is coupled to the connection interface unit and the rewritable non-volatile memory module. The memory control circuit unit is configured to establish a connection between the memory storage apparatus and the host system. The memory control circuit unit is further configured to store a first data to a memory of the host system via the connection. The memory control circuit unit is further configured to detect an error in the first data in the memory. The memory control circuit unit is further configured to rebuild a part of data in the first data in the memory according to the error.

An exemplary embodiment of the invention further provides a memory control circuit unit configured to control a memory storage apparatus. The memory storage apparatus includes a rewritable non-volatile memory module. The memory control circuit unit includes a host interface, a memory interface, and a memory management circuit. The host interface is configured to be coupled to the host system. The memory interface is configured to be coupled to the rewritable non-volatile memory module. The memory management circuit is coupled to the host interface and the memory interface. The memory management circuit is configured to establish a connection between the memory storage apparatus and the host system. The memory management circuit is further configured to store a first data to a memory of the host system via the connection. The memory management circuit is further configured to detect an error in the first data in the memory. The memory management circuit is further configured to rebuild a part of data in the first data in the memory according to the error.

Based on the above, after the connection between the memory storage apparatus and the host system is established, the first data may be stored in the memory of the host system via the connection. Thereafter, when an error in the first data in the memory is detected, part of the data in the first data may be rebuilt in the memory according to the error. In this way, the fault tolerance of the memory storage apparatus to the shared memory in the host system may be improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

A memory storage apparatus (also referred to as a memory storage system) typically includes a rewritable non-volatile memory module and a controller (also referred to as a control circuit unit). The memory storage apparatus is usually used together with a host system, such that the host system is able to write data into or read data from the memory storage apparatus.

Figure 1:
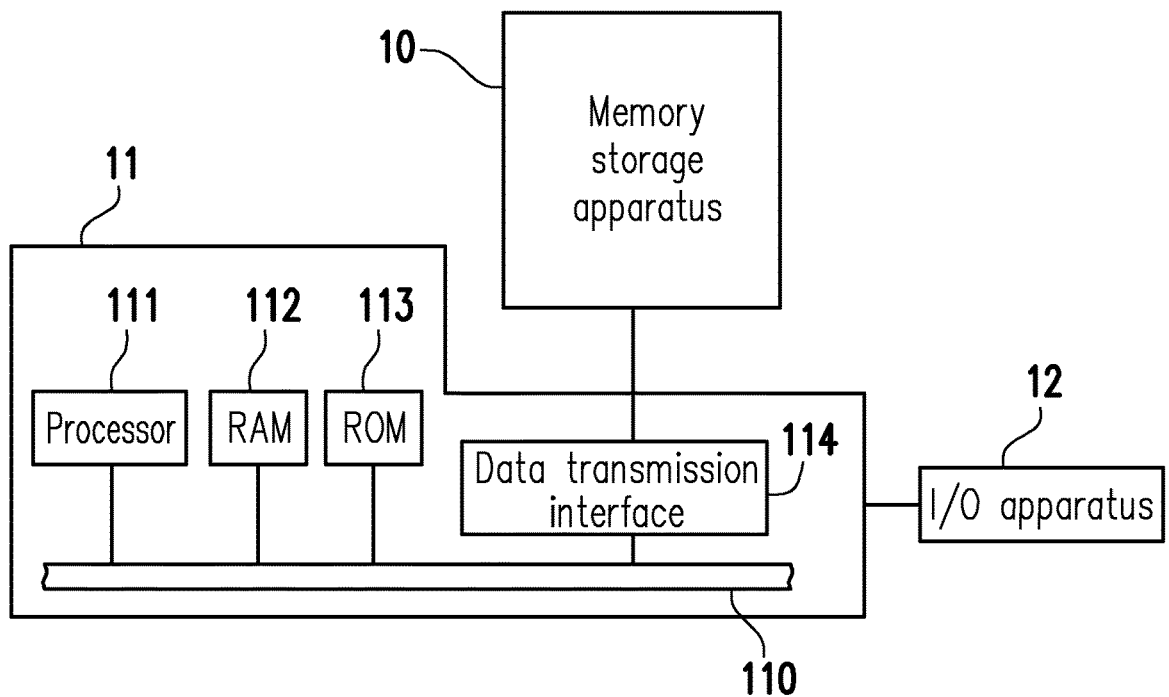
FIG. 1 is a schematic diagram illustrating a host system, a memory storage apparatus, and an input/output (I/O) apparatus according to an exemplary embodiment.
Figure 2:
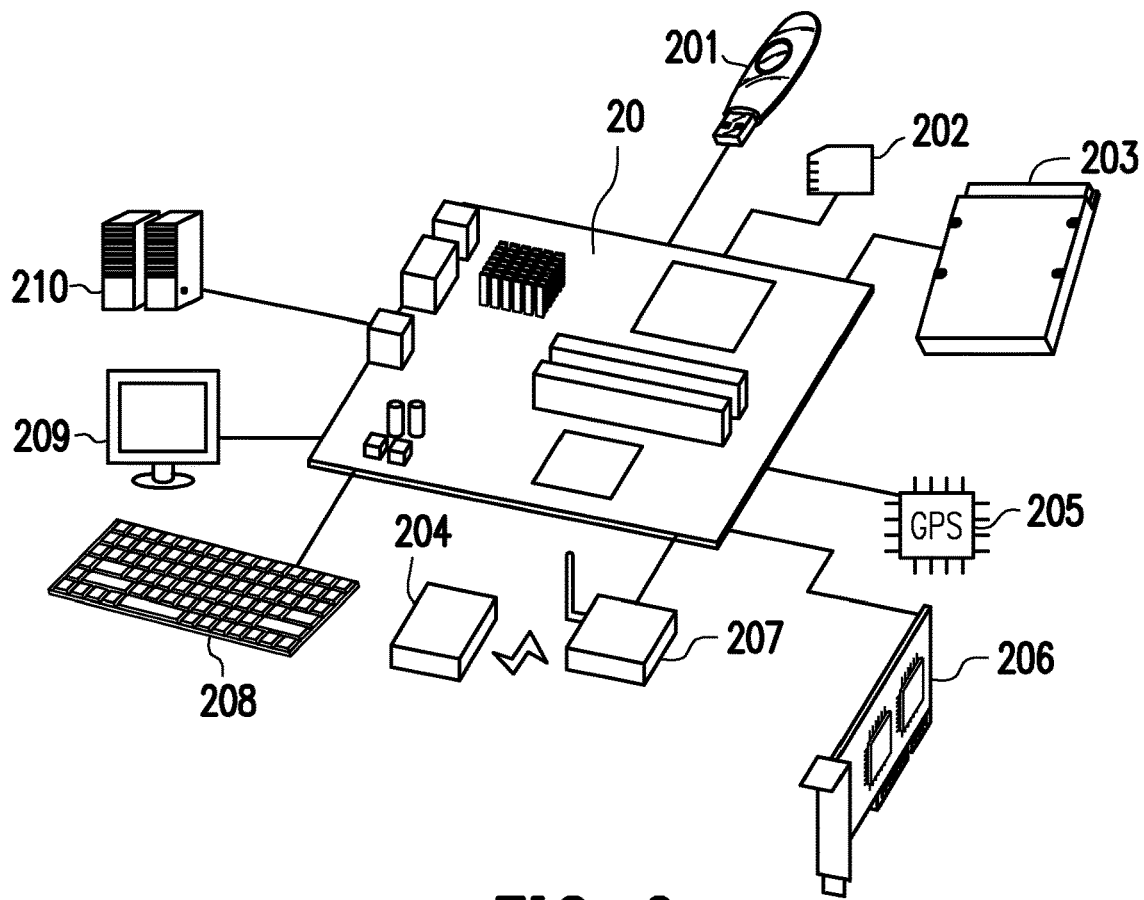
FIG. 2 is a schematic diagram illustrating a host system, a memory storage apparatus, and an I/O apparatus according to another exemplary embodiment.

FIG. 1 is a schematic diagram illustrating a host system, a memory storage apparatus, and an input/output (I/O) apparatus according to an exemplary embodiment. FIG. 2 is a schematic diagram illustrating a host system, a memory storage apparatus, and an I/O apparatus according to another exemplary embodiment.

With reference to FIG. 1 and FIG. 2, a host system 11 generally includes a processor 111, a random-access memory (RAM) 112, a read-only memory (ROM) 113, and a data transmission interface 114. The processor 111, the RAM 112, the ROM 113, and the data transmission interface 114 are coupled to a system bus 110.

In an exemplary embodiment, the host system 11 is coupled to the memory storage apparatus 10 through the data transmission interface 114. For instance, the host system 11 writes data into the memory storage apparatus 10 or read data from the memory storage apparatus 10 through the data transmission interface 114. The host system 11 is coupled to the I/O apparatus 12 through the system bus 110. For instance, the host system 11 transmits an output signal to the I/O apparatus 12 or receives an output signal from the I/O apparatus 12 through the system bus 110.

In the present exemplary embodiment, the processor 111, the RAM 112, the ROM 113, and the data transmission interface 114 are configured on a motherboard 20 of the host system 11. The number of the data transmission interface 114 may be one or plural. The motherboard 20 is coupled to the memory storage apparatus 10 in a wireless manner or via a cable through the data transmission interface 114. The memory storage apparatus 10 is, for instance, a flash drive 201, a memory card 202, a solid-state drive (SSD) 203, or a wireless memory storage apparatus 204. The wireless memory storage apparatus 204 may be a memory storage apparatus employing various wireless communication techniques, such as a near-field communication (NFC) memory storage apparatus, a wireless fidelity (Wi-Fi) memory storage apparatus, a Bluetooth memory storage apparatus (e.g., an iBeacon) with low power consumption, and so on. The motherboard 20 may also be coupled to a variety of I/O apparatuses, such as a global positioning system (GPS) module 205, a network interface card 206, a wireless transmission apparatus 207, a keyboard 208, a screen 209, and a speaker 210 through the system bus 110. For instance, in an exemplary embodiment, the motherboard 20 may access the wireless memory storage apparatus 204 through the wireless transmission apparatus 207.

In an exemplary embodiment, the host system 11 is a computer system. In an exemplary embodiment, the host system 11 may be any system that may substantially store data with the memory storage apparatus.

Figure 3:
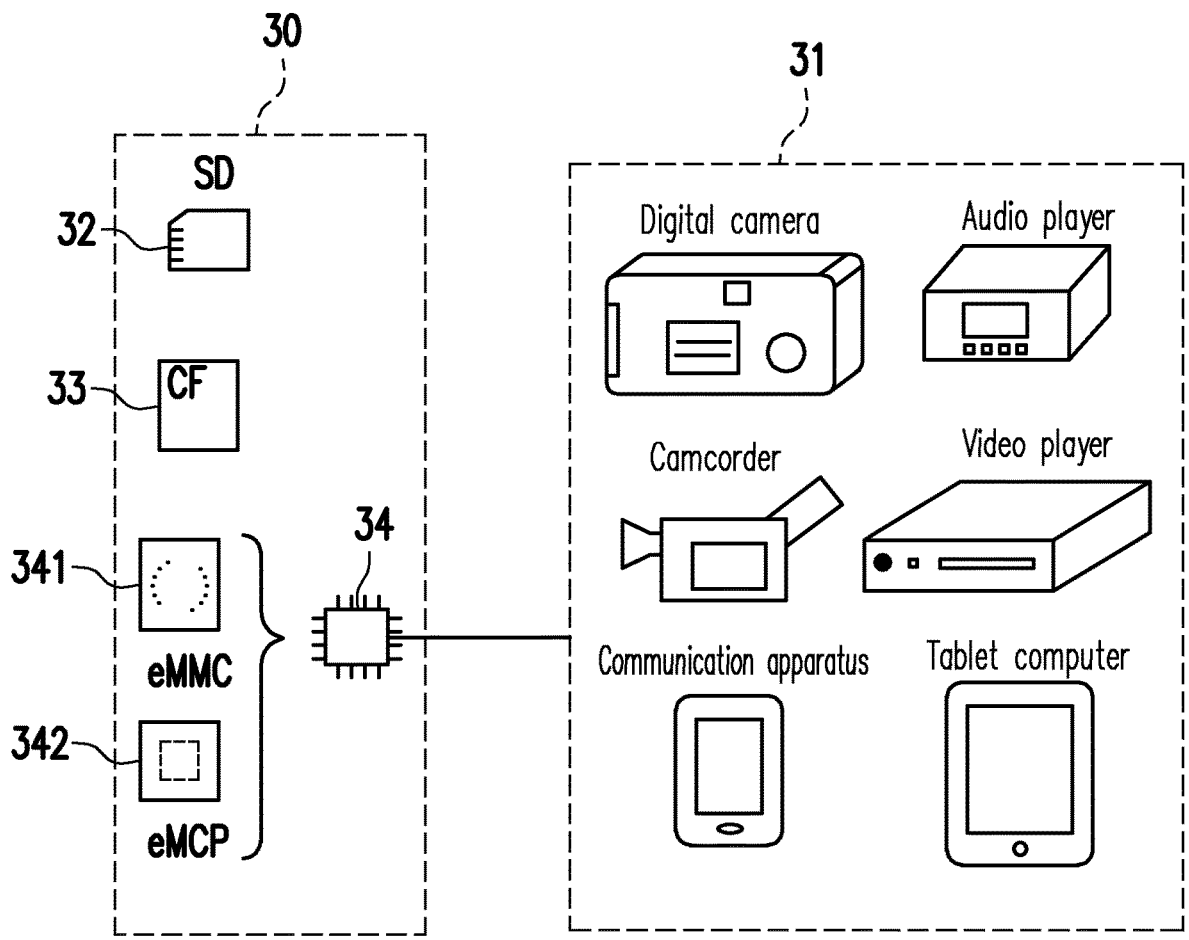
FIG. 3 is a schematic diagram illustrating a host system and a memory storage apparatus according to another exemplary embodiment the invention.

FIG. 3 is a schematic diagram illustrating a host system and a memory storage apparatus according to another exemplary embodiment the invention. With reference to FIG. 3, in another exemplary embodiment, a host system 31 may also be a digital camera, a camcorder, a communication apparatus, an audio player, a video player, a tablet computer, and so on, while a memory storage apparatus 30 used by the host system 31 may be a non-volatile memory apparatus, such as a secure digital (SD) card 32, a compact flash (CF) card 33, and an embedded storage device 34. The embedded storage device 34 includes an embedded multimedia card (eMMC) 341 and/or an embedded multi-chip package (eMCP) storage device 342, wherein a memory module is directly coupled to a substrate of the host system.

Figure 4:
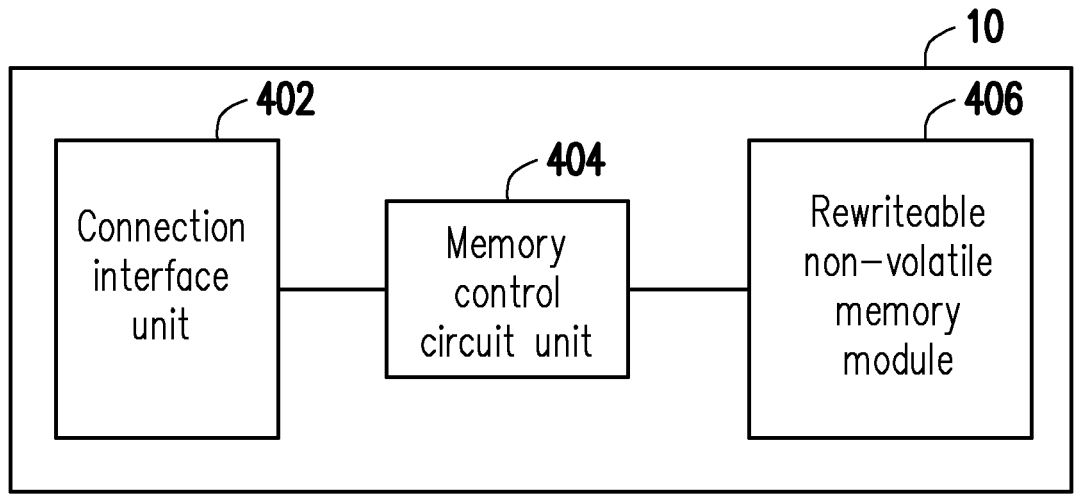
FIG. 4 is a schematic block diagram illustrating a memory storage apparatus according to an exemplary embodiment of the invention.

FIG. 4 is a schematic block diagram illustrating a memory storage apparatus according to an exemplary embodiment of the invention. Referring to FIG. 4, the memory storage apparatus 10 includes a connection interface unit 402, a memory control circuit unit 404, and a rewritable non-volatile memory module 406.

The connection interface unit 402 is configured to couple the memory storage apparatus 10 to the host system 11. The memory storage apparatus 10 may communicate with the host system 11 via the connection interface unit 402. In an exemplary embodiment, the connection interface unit 402 is compatible with the Peripheral Component Interconnect Express (PCI Express) standard. In an exemplary embodiment, the connection interface unit 402 may also be compatible with the Serial Advanced Technology Attachment (SATA) standard, Parallel Advanced Technology Attachment (PATA) standard, Institute of Electrical and Electronic Engineers (Institute of Electrical and Electronic Engineers, IEEE) 1394 standard, Universal Serial Bus (USB) standard, SD interface standard, Ultra High Speed-I (UHS-I) interface standard, Ultra High Speed-II (UHS-II) interface standard, Memory Stick (MS) interface standard, MCP interface standard, MMC interface standard, eMMC interface standard, Universal Flash Storage (UFS) interface standard, eMCP interface standard, CF interface standard, Integrated Device Electronics (IDE) standard, or other suitable standards. The connection interface unit 402 may be sealed in one chip with the memory control circuit unit 404. Alternatively, the connection interface unit 402 is disposed outside of a chip containing the memory control circuit unit 404.

The memory control circuit unit 404 is coupled to the connection interface unit 402 and the rewritable non-volatile memory module 406. The memory control circuit unit 404 is configured to execute a plurality of logic gates or control commands implemented in a hardware form or in a firmware form. The memory control circuit unit 404 also performs operations such as writing, reading, and erasing data in the rewritable non-volatile memory storage module 406 according to the commands of the host system 11.

The rewritable non-volatile memory module 406 is configured to store the data written by the host system 11. The rewritable non-volatile memory module 406 may include a single-level cell (SLC) NAND-type flash memory module (that is, a flash memory module that may store 1 bit in one memory cell), a multi-level cell (MLC) NAND-type flash memory module (that is, a flash memory module that may store 2 bits in one memory cell), a triple-level cell (TLC) NAND-type flash memory module (i.e., a flash memory module that may store 3 bits in one memory cell), a quad-level cell (QLC) NAND-type flash memory module (that is, a flash memory module that may store 4 bits in one memory cell), other flash memory modules, or other memory modules with the same characteristics.

Each of the memory cells in the rewritable non-volatile memory module 406 stores one or a plurality of bits via the change in voltage (also referred to as threshold voltage hereinafter). Specifically, a charge-trapping layer is disposed between the control gate and the channel of each of the memory cells. By applying a write voltage to the control gate, the number of electrons of the charge-trapping layer may be changed, and therefore the threshold voltage of the memory cells may be changed. This operation of changing the threshold voltage of the memory cells is also referred to as "writing data to the memory cells" or "programming the memory cells". As the threshold voltage is changed, each of the memory cells in the rewritable non-volatile memory module 406 has a plurality of storage statuses. Which storage status one memory cell belongs to may be determined via the application of a read voltage, so as to obtain one or a plurality of bits stored by the memory cell.

In an exemplary embodiment, the memory cells of the rewritable non-volatile memory module 406 may form a plurality of physical programming units, and these physical programming units may form a plurality of physical erasing units. Specifically, the memory cells on the same word line may form one or a plurality of physical programming units. If each memory cell may store two or more bits, the physical programming units on the same word line may at least be classified into lower physical programming units and upper physical programming units. For example, the least significant bit (LSB) of a memory cell belongs to a lower physical programming unit, and the most significant bit (MSB) of a memory cell belongs to an upper physical programming unit. Generally, in an MLC NAND-type flash memory, the write speed of the lower physical programming units is greater than the write speed of the upper physical programming units, and/or the reliability of the lower physical programming units is greater than the reliability of the upper physical programming units.

In an exemplary embodiment, the physical programming unit is the smallest unit of programming. That is, the physical programming unit is the smallest unit of data writing. For example, the physical programming unit may be a physical page or a physical sector. If the physical programming unit is a physical page, then the physical programming unit may include a data bit area and a redundant bit area. The data bit area contains a plurality of physical pages configured to store user data, and the redundant bit area is configured to store system data (for example, management data such as an ECC). In an exemplary embodiment, the data bit area contains 32 physical pages, and the size of one physical sector is 512 bytes (B). However, in other exemplary embodiments, the data bit area may also contain 8, 16, or a greater or lesser number of physical pages, and the size of each of the physical pages may also be greater or smaller. Moreover, the physical erasing unit is the smallest unit of erasing. That is, each of the physical erasing units contains the smallest number of memory cells erased together. For example, the physical erasing unit is a physical block.

Figure 5:
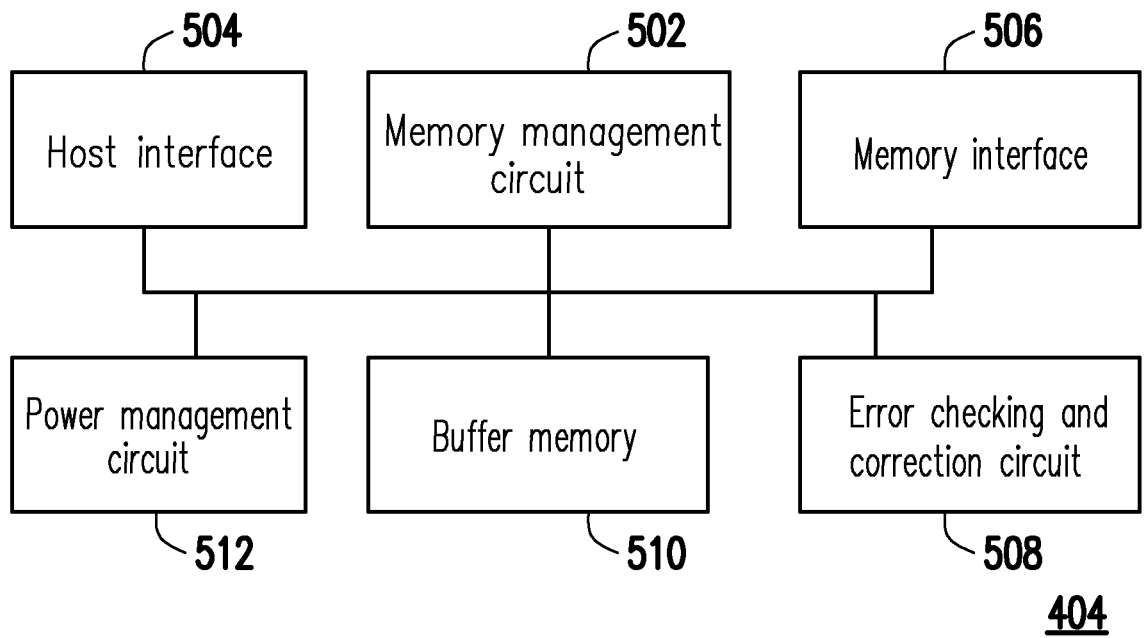
FIG. 5 is a schematic block diagram illustrating a memory control circuit unit according to an exemplary embodiment of the invention.

FIG. 5 is a schematic block diagram illustrating a memory control circuit unit according to an exemplary embodiment of the invention. Referring to FIG. 5, the memory control circuit unit 404 includes a memory management circuit 502, a host interface 504, a memory interface 506, and an error checking and correction circuit 508.

The memory management circuit 502 is configured to control the overall operation of the memory control circuit unit 404. Specifically, the memory management circuit 502 has a plurality of control commands. During operation of the memory storage apparatus 10, the control commands are executed to perform operations such as writing, reading, and erasing data. In the following, descriptions relating to the operation of the memory management circuit 502 are equivalent to the descriptions of the operation of the memory control circuit unit 404.

In an exemplary embodiment, the control commands of the memory management circuit 502 are implemented in a firmware form. For example, the memory management circuit 502 has a microprocessor unit (not shown) and a read-only memory (not shown), and the control commands are burned into the ROM. During the operation of the memory storage apparatus 10, the control commands are executed by the microprocessor unit to perform operations such as writing, reading, and erasing data.

In an exemplary embodiment, the control commands of the memory management circuit 502 may also be stored in the form of program codes in a specific area (for example, the system area in a memory module exclusively configured to store system data) of the rewritable non-volatile memory module 406. Moreover, the memory management circuit 502 has a microprocessor unit (not shown), a ROM (not shown), and a RAM (not shown). In particular, the ROM has a boot code, and when the memory control circuit unit 404 is enabled, the microprocessor unit first executes the boot code to load the control commands stored in the rewritable non-volatile memory module 406 into the RAM of the memory management circuit 502. Next, the microprocessor unit runs the control commands to perform operations such as writing, reading, and erasing data.

In an exemplary embodiment, the control commands of the memory management circuit 502 may also be implemented in a hardware form. For example, the memory management circuit 502 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. The memory cell management circuit is configured to manage the memory cells or memory cell groups of the rewritable non-volatile memory module 406. The memory write circuit is configured to issue a write command sequence to the rewritable non-volatile memory module 406 to write data into the rewritable non-volatile memory module 406. The memory read circuit is configured to issue a read command sequence to the rewritable non-volatile memory module 406 to read data from the rewritable non-volatile memory module 406. The memory erase circuit is configured to issue an erase command sequence to the rewritable non-volatile memory module 406 to erase data from the rewritable non-volatile memory module 406. The data processing circuit is configured to process data to be written into the rewritable non-volatile memory module 406 and data read from the rewritable non-volatile memory module 406. The write command sequence, the read command sequence, and the erase command sequence may independently include one or a plurality of program codes or command codes and be configured to instruct the rewritable non-volatile memory module 406 to execute corresponding operations such as writing, reading, and erasing. In an exemplary embodiment, the memory management circuit 502 may also issue other types of command sequences to the rewritable non-volatile memory module 406 to instruct the execution of corresponding operations.

The host interface 504 is coupled to the memory management circuit 502. The memory management circuit 502 may communicate with the host system 11 via the host interface 504. The host interface 504 may be used to receive and identify commands and data sent by the host system 11. For example, the commands and data sent by the host system 11 may be sent to the memory management circuit 502 via the host interface 504. In addition, the memory management circuit 502 may send data to the host system 11 via the host interface 504. In the present exemplary embodiment, the host interface 504 is compatible with the PCI Express standard. However, it should be understood that the invention is not limited thereto, and the host interface 504 may also be compatible with the SATA standard, PATA standard, IEEE 1394 standard, USB standard, SD standard, UHS-I standard, UHS-II standard, MS standard, MMC standard, eMMC standard, UFS standard, CF standard, IDE standard, or other suitable standards for data transmission.

The memory interface 506 is coupled to the memory management circuit 502 and is configured to access the rewritable non-volatile memory module 406. In other words, data to be written into the rewritable non-volatile memory module 406 is converted to a format acceptable to the rewritable non-volatile memory module 406 via the memory interface 506. Specifically, if the memory management circuit 502 is to access the rewritable non-volatile memory module 406, the memory interface 506 sends corresponding command sequences. For example, the command sequences may include a write command sequence instructing data writing, a read command sequence instructing data reading, an erase command sequence instructing data erasing, and corresponding command sequences configured to instruct various memory operations (such as changing read voltage level or executing a garbage collection operation). The command sequences are generated by, for example, the memory management circuit 502 and sent to the rewritable non-volatile memory module 406 via the memory interface 506. The command sequences may include one or a plurality of signals or data on a bus. The signals or data may include a command code or a program code. For example, when reading a command sequence, information such as read identification code or memory address is included.

The error checking and correction circuit 508 is coupled to the memory management circuit 502 and is configured to execute an error checking and correction operation to ensure the correctness of data. Specifically, when the memory management circuit 502 receives a write command from the host system 11, the error checking and correction circuit 508 generates a corresponding error correcting code (ECC) and/or an error detecting code (EDC) for data corresponding to the write command, and the memory management circuit 502 writes the data corresponding to the write command and the corresponding ECC and/or EDC into the rewritable non-volatile memory module 406. Next, when reading data from the rewritable non-volatile memory module 406, the memory management circuit 502 reads the ECC and/or the EDC corresponding to the data at the same time, and the error checking and correction circuit 508 executes an error checking and correction operation on the read data based on the ECC and/or the EDC.

In an exemplary embodiment, the memory control circuit unit 404 further includes a buffer memory 510 and a power management circuit 512. The buffer memory 510 is coupled to the memory management circuit 502 and is configured to temporarily store data and commands from the host system 11 or data from the rewritable non-volatile memory module 406. The power management circuit 512 is coupled to the memory management circuit 502 and is configured to control the power of the memory storage apparatus 10.

In an exemplary embodiment, in FIG. 4, the memory storage apparatus 10 is also referred to as a flash memory device, the rewritable non-volatile memory module 406 is also referred to as a flash memory module, and the memory control circuit unit 404 is also referred to as a flash memory controller configured to control the flash memory module. In an exemplary embodiment, the memory management circuit 502 of FIG. 5 is also referred to as a flash memory management circuit.

Figure 6:
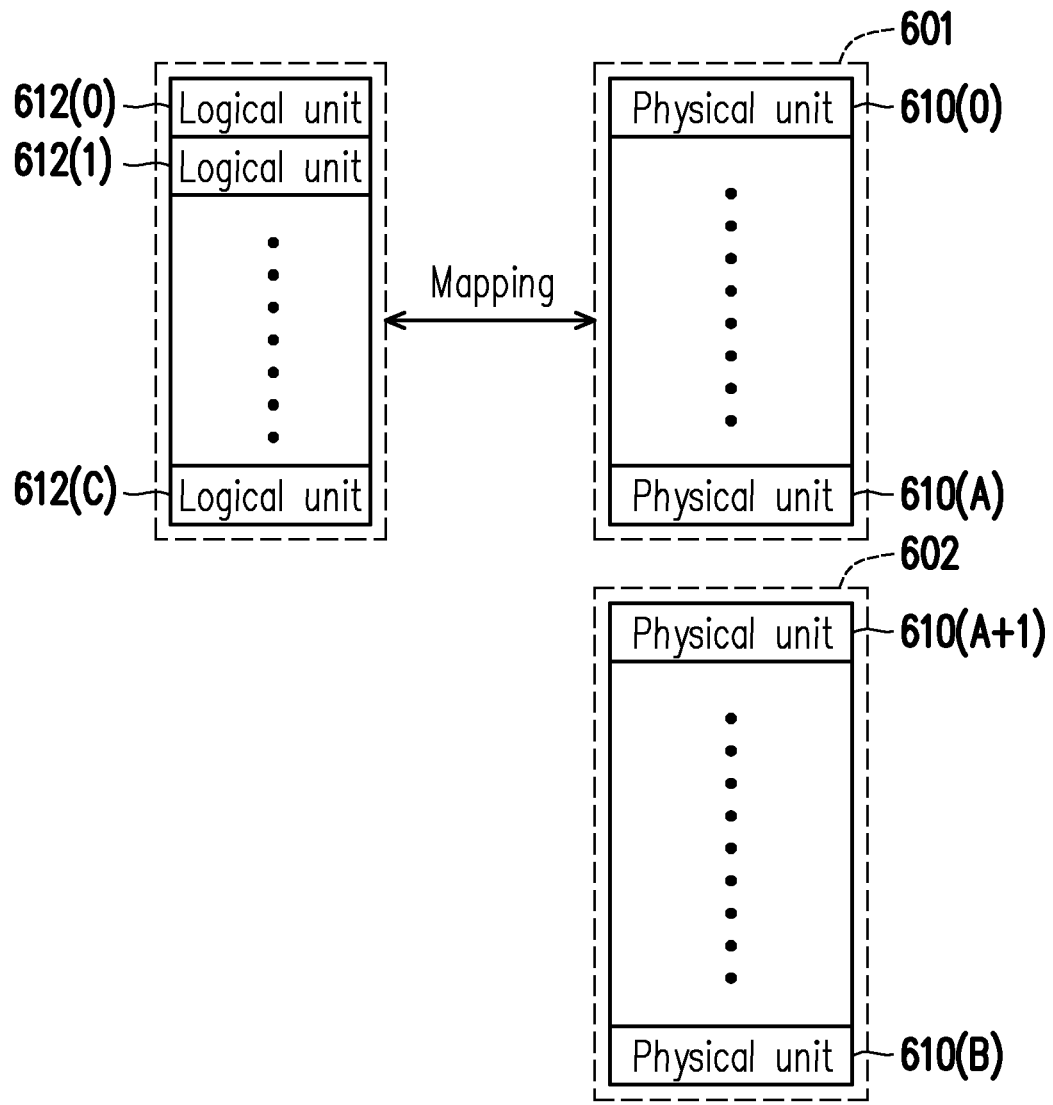
FIG. 6 is a schematic illustrating the management of a rewritable non-volatile memory module according to an exemplary embodiment of the invention.

FIG. 6 is a schematic illustrating the management of a rewritable non-volatile memory module according to an exemplary embodiment of the invention. Referring to FIG. 6, the memory management circuit 502 may logically group physical units 610(0) to 610(C) in the rewritable non-volatile memory module 406 into a storage area 601 and a system area 602. One physical unit may refer to one physical address, one physical programming unit, one physical erasing unit, or be formed by a plurality of continuous or discontinuous physical addresses.

The physical units 610(0) to 610(A) in the storage area 601 are configured to store user data (for example, user data from the host system 11 in FIG. 1). For example, the physical units 610(0) to 610(A) in the storage area 601 may store valid data and invalid data. The physical units 610(A+1) to 610(B) in the system area 602 are configured to store management data (also called system data), such as logical-to-physical mapping table, bad block management table, device model, or other types of management data.

The memory management circuit 502 may configure logical units 612(0) to 612(C) to map the physical units 610(0) to 610(A) in the storage area 601. In an exemplary embodiment, each of the logical units corresponds to one logical address. For example, one logical address may include one or a plurality of logical block addresses (LBAs) or other logical management units. In another exemplary embodiment, one logical unit may also correspond to one logic programming unit, one logic erasing unit, or formed by a plurality of continuous or discontinuous logical addresses. Moreover, each of the logical units may be mapped to one or a plurality of physical units. It should be noted that, in an exemplary embodiment, the memory management circuit 502 may not be configured with logical units mapped to the system area 602 to prevent the management data stored in the system area 602 from being modified by the user.

The memory management circuit 502 may record the management data describing the mapping relationship between logical units and physical units (also called logical-to-physical or logical address to logical address (L2P) mapping information) in at least one L2P mapping table. The L2P mapping table is stored in the physical units of the system area 602. When the host system 11 is to read data from the memory storage apparatus 10 or write data to the memory storage apparatus 10, the memory management circuit 502 may execute a data access operation on the memory storage apparatus 10 according to the L2P mapping table.

Figure 7:
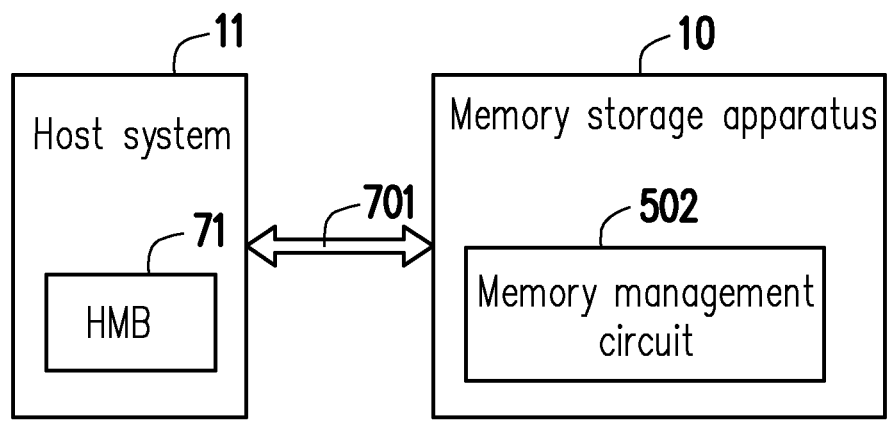
FIG. 7 is a schematic illustrating a host system and a memory storage apparatus according to an exemplary embodiment of the invention.

FIG. 7 is a schematic of a host system and a memory storage apparatus illustrated according to an exemplary embodiment of the invention. Please refer to FIG. 7, both the host system 11 and the memory storage apparatus 10 support host memory buffering techniques. Under the host memory buffering architecture, the host system 11 may provide a host memory buffer (HMB) 71 to the memory storage apparatus 10 for use. For example, the host memory buffer 71 may include at least one random-access memory and may be used to temporarily store data. It should be noted that the invention does not limit the total number, capacity, and type of the memory in the host memory buffer 71.

In an exemplary embodiment, the memory management circuit 502 may establish a connection 701 between the memory storage apparatus 10 and the host system 11. For example, the memory management circuit 502 may perform one handshake operation with the host system 11 to establish the connection 701. After the connection 701 is established, the memory management circuit 502 may access the host memory buffer 71 via the connection 701 (for example, store data in the host memory buffer 71 or read data from the host memory buffer 71) and communicate with the host system 11. In an exemplary embodiment, the connection 701 between the memory storage apparatus 10 and the host system 11 conforms to the high-speed non-volatile memory (NVM Express, NVMe) specification.

In an exemplary embodiment, the memory management circuit 502 may receive one request from the host system 11. This request is configured to inquire whether the memory storage apparatus 10 supports host memory buffering. The memory management circuit 502 may provide one response to the host system 11 according to the request. This response may inform the host system 11 whether the memory storage apparatus 10 supports host memory buffering.

In an exemplary embodiment, if the memory storage apparatus 10 supports host memory buffering, the host system 11 may enable the host memory buffer 71 for the memory storage apparatus 10 to access according to the response. In an exemplary embodiment, if the memory storage apparatus 10 does not support host memory buffering, the host system 11 may not enable the host memory buffer 71. In an exemplary embodiment, if the memory storage apparatus 10 supports host memory buffering, the response may also inform the host system 11 of the memory space and the like needed to execute host memory buffering and other parameters related to host memory buffering. The host system 11 may configure the host memory buffer 71 according to the response.

In an exemplary embodiment, the host memory buffer 71 may be configured to replace at least part of the buffer memory in the memory storage apparatus 10 (for example, the buffer memory 510 in FIG. 5). In an exemplary embodiment, the host memory buffer 71 may be used with at least part of the buffer memory in the memory storage apparatus 10 (for example, the buffer memory 510 of FIG. 5) for the memory management circuit 502 to use. In an exemplary embodiment, the memory management circuit 502 may use the host memory buffer 71 instead of using at least part of the buffer memory in the memory storage apparatus 10 (for example, the buffer memory 510 of FIG. 5). In an exemplary embodiment, under the condition that the memory management circuit 502 may use the host memory buffer 71, the memory storage apparatus 10 may not be configured with any buffer memory (for example, the buffer memory 510 of FIG. 5).

In an exemplary embodiment, after the connection 701 is established, the memory management circuit 502 may store data (also referred to as the first data) to the host memory buffer 71 via the connection 701. For example, the first data may include management data read from the system area 602 of FIG. 6. For example, the first data may include at least one management table recording L2P mapping information. After storing the first data in the host memory buffer 71, the memory management circuit 502 may access the rewritable non-volatile memory module 406 according to the first data currently temporarily stored in the host memory buffer 71.

In an exemplary embodiment, after storing the first data in the host memory buffer 71, the memory management circuit 502 may actively detect an error in the first data in the host memory buffer 71. Then, the memory management circuit 502 may rebuild part of the data in the first data in the host memory buffer 71 according to the detected error.

Figure 8:
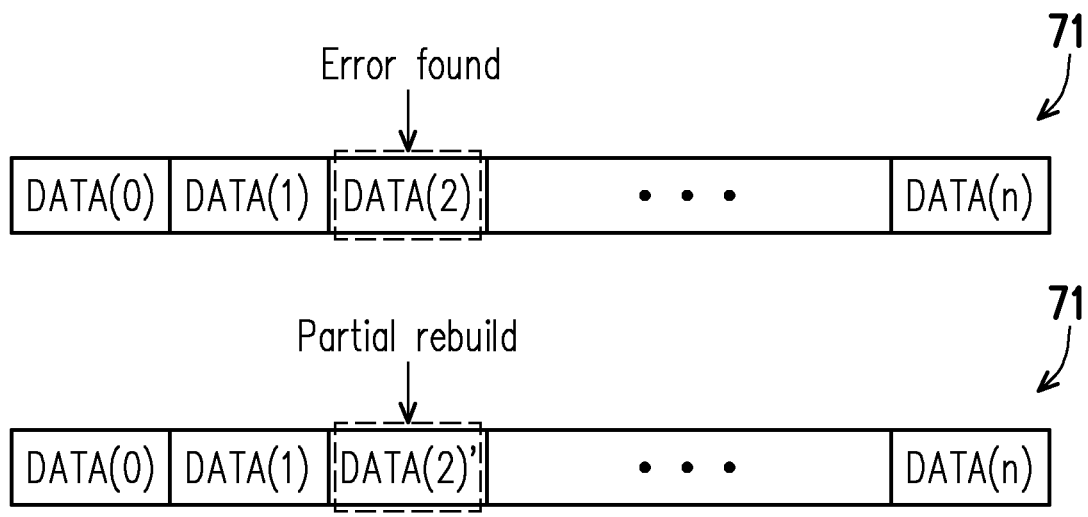
FIG. 8 is a schematic diagram illustrating rebuilding part in a first data in a memory of a host system according to an exemplary embodiment of the invention.

FIG. 8 is a schematic diagram illustrating rebuilding part of a first data in a memory of a host system according to an exemplary embodiment of the invention. Please refer to FIG. 8, the memory management circuit 502 may store data DATA(0) to DATA(n) in the host memory buffer 71. For example, the data DATA(0) to DATA(n) may include the management data (for example, L2P mapping information) read from the system area 602 of FIG. 6. Thereafter, it is assumed that the memory management circuit 502 detects an error in the data DATA(2) in the host memory buffer 71 (or the data DATA(2) is affected by the error so that the data accuracy thereof is reduced). In response to the error, the memory management circuit 502 may perform partial rebuilding of the data (including the data DATA(2)) affected by the error to try to eliminate the influence of the error on the related data. For example, in the partial rebuilding of the data DATA(2), the data DATA(2) may be updated to a data DATA(2)' (or replaced by the data DATA(2)'). Compared with the data DATA(2), the new data DATA(2)' is not affected by the error.

In an exemplary embodiment, when performing partial rebuilding of the data (such as the data DATA(2)) affected by the error in the host memory buffer 71, the memory management circuit 502 may not rebuild at least part of the data in the host memory buffer 71 not affected by the error. Taking FIG. 8 as an example, assuming that only the data DATA(2) in the host memory buffer 71 is affected by the error, the memory management circuit 502 may only partially rebuild the data DATA(2), and the rest of the data DATA(0), DATA(1), and DATA(3) to DATA(n) may not be changed (that is, rebuilt). In this way, the data rebuilding efficiency of the host memory buffer 71 may be effectively improved.

In an exemplary embodiment, after the first data is stored in the host memory buffer 71, the memory management circuit 502 may actively read at least part of the first data (also referred to as the second data) from the host memory buffer 71. The memory management circuit 502 may instruct the error checking and correction circuit 508 to decode the read second data. The memory management circuit 502 may detect the error in the first data in the host memory buffer 71 according to the decoding result of the second data by the error checking and correction circuit 508.

In an exemplary embodiment, the error checking and correction circuit 508 may decode the data (i.e., the second data) read from the host memory buffer 71. If the decoding result reflects an error in a piece of data read from the host memory buffer 71, the error checking and correction circuit 508 may try to correct the error. The memory management circuit 502 may restore the corrected data to the host memory buffer 71 to replace the original data in the host memory buffer 71 with an error. However, in an exemplary embodiment, if the decoding result reflects that there is an uncorrectable error in a piece of data read from the host memory buffer 71 (for example, the total number of error bits in a piece of data exceeds a preset value), the memory management circuit 502 may partially rebuild the data in the host memory buffer 71 affected by the error. However, in an exemplary embodiment, once the decoding result reflects that there is an error in a piece of data read from the host memory buffer 71, regardless of whether the error may be corrected, the memory management circuit 502 partially rebuilds the data in the host memory buffer 71 affected by the error.

In an exemplary embodiment, the error checking and correction circuit 508 may decode the data read from the host memory buffer 71 using the verification code contained in the data read from the host memory buffer 71. For example, the verification code may include a cyclic redundancy check (CRC) code. In an exemplary embodiment, the error checking and correction circuit 508 may determine whether there is an error in the corresponding data according to the verification code.

In an exemplary embodiment, in the operation of partially rebuilding part of the data of the first data in the host memory buffer 71, the memory management circuit 502 may read the management data that may be configured to rebuild the part of the data of the first data from the memory storage apparatus 10. The memory management circuit 502 may partially rebuild part of the data of the first data in the host memory buffer 71 according to the management data.

In an exemplary embodiment, the management data that may be configured to rebuild the part of the data of the first data may include information reflecting the mapping relationship between at least one logical unit and at least one physical unit (also referred to as mapping information). The memory management circuit 502 may partially rebuild part of the data of the first data in the host memory buffer 71 according to at least part of the mapping information.

In an exemplary embodiment, the management data that may be configured to rebuild the part of the data of the first data may include physical-to-logical or physical address to logical address (P2L) mapping information. For example, during the operation of the memory storage apparatus 10, the P2L mapping information may be temporarily stored in the buffer memory 510 of the memory storage apparatus 10. The P2L mapping information may reflect the mapping relationship between the at least one logical unit and the at least one physical unit. In an exemplary embodiment, the memory management circuit 502 may read P2L mapping information (or L2P mapping information) related to the data (for example, the data DATA(2) in FIG. 8) in the host memory buffer 71 affected by the error from the buffer memory 510. However, the memory management circuit 502 may partially rebuild part of the data of the first data in the host memory buffer 71 according to the P2L mapping information (or L2P mapping information).

In an exemplary embodiment, the memory management circuit 502 may also read mapping information (such as P2L mapping information) related to the data (such as the DATA (2) of FIG. 8) affected by the error in the host memory buffer 71 from at least one physical unit in the storage area 601 of FIG. 6. Then, the memory management circuit 502 may partially rebuild part of the data of the first data in the host memory buffer 71 according to the mapping information.

In an exemplary embodiment, the memory management circuit 502 may first try to read the management data needed to perform the partial rebuilding from the buffer memory 510. If the management data needed to perform the partial rebuilding may not be obtained from the buffer memory 510, the memory management circuit 502 may instead read the management data needed to perform the partial rebuilding from the physical unit.

In an exemplary embodiment, the memory management circuit 502 may determine one reference information area in the read management data (for example, mapping information) according to the data range affected by the error. The memory management circuit 502 may partially rebuild part of the data of the first data in the host memory buffer 71 according to the information in the reference information area.

Figure 9:
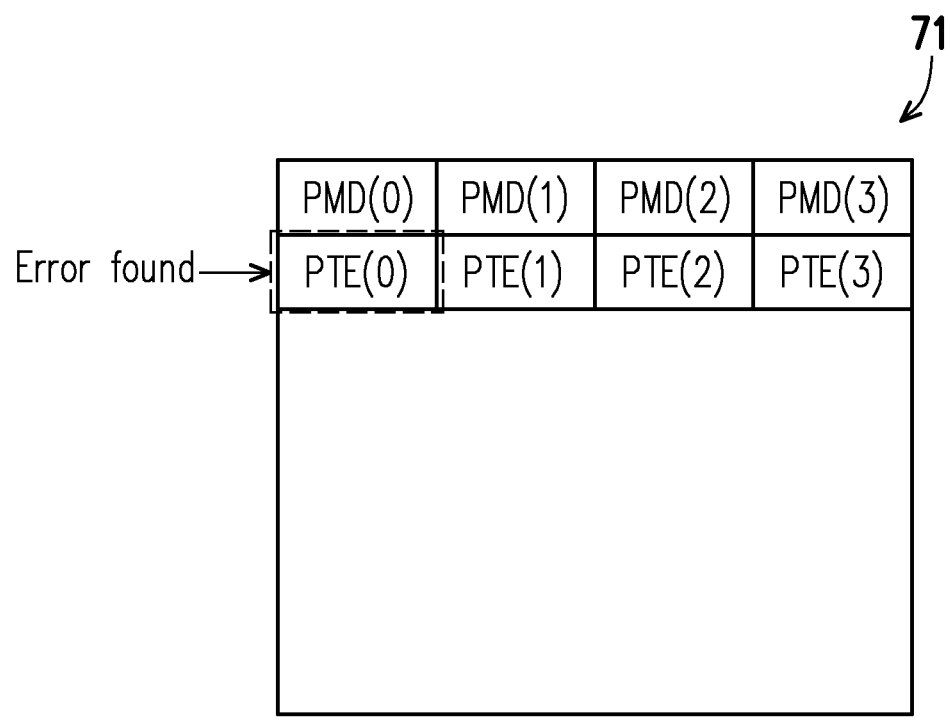
FIG. 9 is a schematic diagram illustrating detecting an error in a first data in a memory of a host system according to an exemplary embodiment of the invention.

FIG. 9 is a schematic diagram illustrating detecting an error in a first data in a memory of a host system according to an exemplary embodiment of the invention. Referring to FIG. 9, it is assumed that the data (i.e., the first data) currently stored in the host memory buffer 71 includes data PMD(0) to PMD(3) and PTE(0) to PTE(3). The data PMD (0) to PMD(3) and PTE(0) to PTE(3) are all management data. For example, the data PMD(0) to PMD(3) and PTE(0) to PTE(3) may reflect the mapping relationship between certain logical units and certain physical units in the rewritable non-volatile memory module 406. For example, the data PTE(0) may record mapping information related to logical units LCA(0) to LCA(1023), the data PTE(1) may record mapping information related to logical units LCA (1024) to LCA(2047), the data PTE (2) may record mapping information related to logical units LCA(2048) to LCA (3071), and the data PMD(0) to PMD(3) may respectively point to the data PTE(0) to PTE(3) in the host memory buffer 71.

In an exemplary embodiment, when the host system 11 instructs to read data from a certain logical unit, the memory management circuit 502 may read data from the physical unit mapped by the logical unit according to at least part of the information in the data PMD(0) to PMD(3) and PTE(0) to PTE(3) in the host memory buffer 71. Alternatively, in an exemplary embodiment, when the host system 11 instructs to store data to a certain logical unit, the memory management circuit 502 may write the data to a certain physical unit and modify at least part of the information in the data PMD(0) to PMD(3) and PTE(0) to PTE(3) in the host memory buffer 71 to record the mapping relationship between the logical unit and the physical unit.

In an exemplary embodiment, it is assumed that the memory management circuit 502 detects an error in the data PTE(0) in the host memory buffer 71 (or the data PTE(0) is affected by the error so that the data accuracy thereof is reduced). In response to the error, the memory management circuit 502 may perform partial rebuilding of the data (including the data PTE(0)) affected by the error to try to eliminate the influence of the error on the related data.

Figure 10:
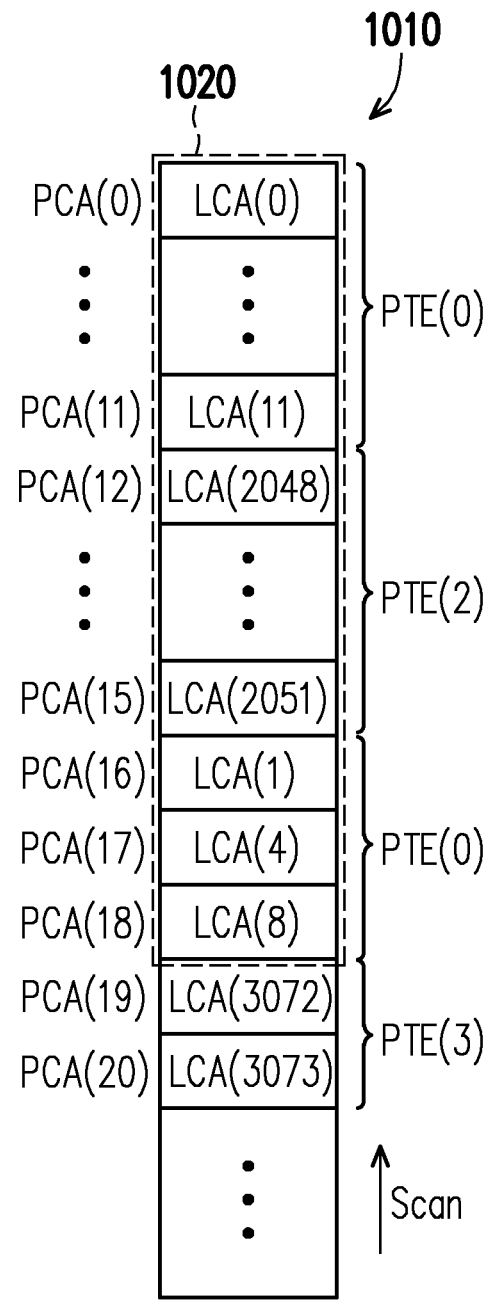
FIG. 10 is a schematic diagram illustrating determining a reference information area in a management data according to an exemplary embodiment of the invention.

FIG. 10 is a schematic diagram illustrating determining a reference information area in a management data according to an exemplary embodiment of the invention. Referring to FIG. 10, in an exemplary embodiment, in response to an error detected in the host memory buffer 71, the memory management circuit 502 may read a management data 1010 from the buffer memory 510. For example, the management data 1010 may include P2L mapping information. In an exemplary embodiment, it is assumed that the P2L mapping information may reflect the mapping relationship between physical units PCA(0) to PCA(11) and the logical units LCA(0) to LCA(11), the mapping relationship between physical units PCA(12) to PCA(15) and the logical units LCA(2024) to LCA(2051), the mapping relationship between a physical unit PCA(16) and the logical unit LCA(1), the mapping relationship between a physical unit PCA(17) and the logical unit LCA(4), the mapping relationship between a physical unit PCA(18) and the logical unit LCA(8), and the mapping relationship between physical units PCA(19) to PCA(20) and logical units LCA(3072) to LCA(3073), as shown in FIG. 10.

In an exemplary embodiment, the memory management circuit 502 may scan forward from the end of the management data 1010 to find the logical unit related to the data PTE(0) affected by the error. For example, it is assumed that the data PTE(0) records mapping information related to the logical units LCA(0) to LCA(1023). In the process of scanning the management information 1010, when the mapping information related to the logical unit LCA(8) is detected (the logical unit LCA(8) belongs to the logical units LCA(0) to LCA(1023)), the memory management circuit 502 may stop scanning and determine one reference information area 1020. For example, the reference information area 1020 may cover the mapping information related to the physical units PCA(0) to PCA(18), as shown in FIG. 10. The memory management circuit 502 may partially rebuild the data affected by the error in the host memory buffer 71 according to the information in the reference information area 1020.

Figure 11:
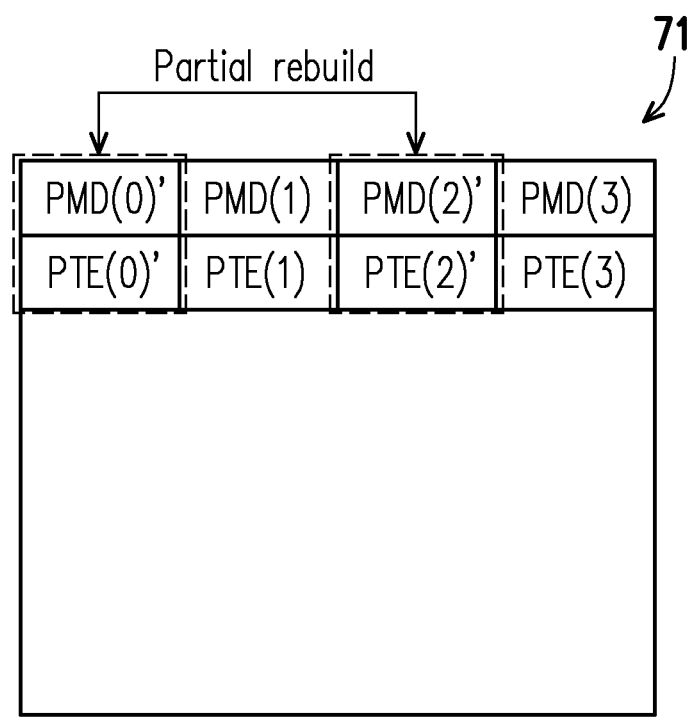
FIG. 11 is a schematic diagram illustrating rebuilding part of a first data in a memory of a host system according to an exemplary embodiment of the invention.

FIG. 11 is a schematic diagram illustrating rebuilding part of a first data in a memory of a host system according to an exemplary embodiment of the invention. Referring to FIG. 11, continuing from the exemplary embodiment in FIG. 10, according to the information in the reference information area 1020, it may be known that the data affected by the error includes mapping information related to the data PTE(0) and PTE(2). Therefore, according to the information in the reference information area 1020, the memory management circuit 502 may partially rebuild the data PTE(0), PTE(2), PMD(0), and PMD(2) in the host memory buffer 71. For example, in the partial rebuilding, the data PTE(0), PTE(2), PMD(0) and PMD(2) may be replaced by new data PTE(0)', PTE(2)', PMD(0)', and PMD(2)' respectively. The new data PTE(0)', PTE(2)', PMD(0)', and PMD(2)' may carry mapping information related to the information in the reference information area 1020. For example, the new data PTE(0)' may record the mapping relationship between the physical units LCA(4) and PCA(17) reflected in the reference information area 1020, and/or the new data PTE(2)' may record the mapping relationship between the physical units LCA (2048) and PCA(12) reflected in the reference information area 1020. In this way, the error information in the host memory buffer 71 previously affected by the error may be corrected.

It should be mentioned that in the exemplary embodiment of FIG. 10, the mapping information related to the data PTE(1) and PTE(3) is not included in the reference information area 1020, which means that the data PTE(1) and PTE(3) in the host memory buffer 71 should not be affected by the error. Therefore, in the exemplary embodiment of FIG. 11, the memory management circuit 502 may not rebuild (for example, update) the data PTE(1), PTE(3), PMD(1), and PMD(3) in the host memory buffer 71, in order to avoid an unnecessary increase of system burden during the data rebuilding, and to improve the performance of performing the data rebuilding.

Figure 12:
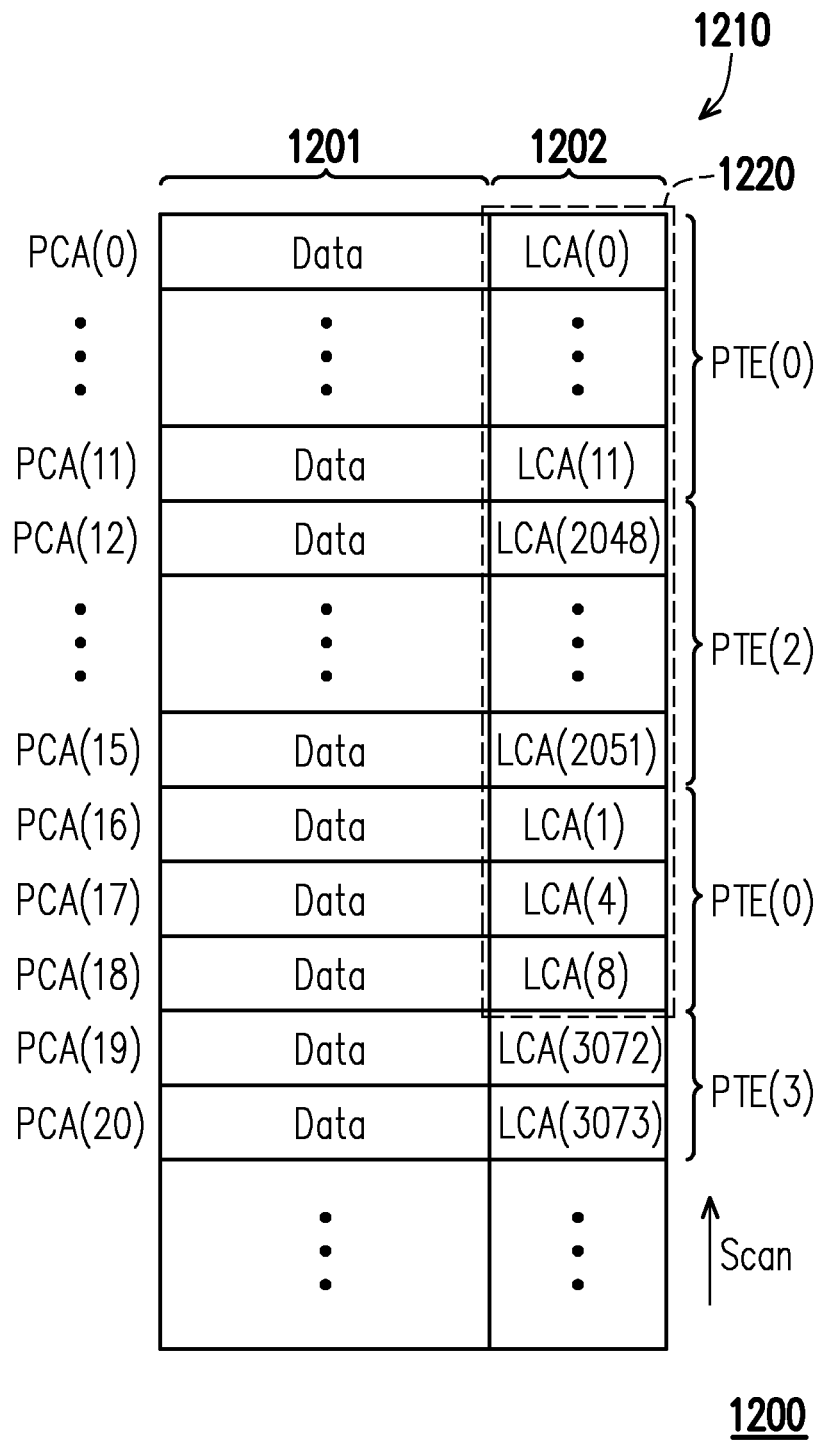
FIG. 12 is a schematic diagram illustrating determining a reference information area in a management data according to an exemplary embodiment of the invention.

FIG. 12 is a schematic diagram illustrating determining a reference information area in a management data according to an exemplary embodiment of the invention. Referring to FIG. 12, in an exemplary embodiment, in response to an error detected in the host memory buffer 71, the memory management circuit 502 may read the management data 1210 from the physical units PCA(0) to PCA(20). A physical unit PCA(i) may have a data storage area 1201 and an idle storage area 1202. The data storage area 1201 is configured to store user data stored in the physical unit PCA(i). The idle storage area 1202 is configured to store the mapping information related to the physical unit PCA(i). For example, the information in the free storage area 1202 of the physical unit PCA(0) may reflect that the physical unit PCA(0) is mapped to the logical unit LCA(0). In other words, the management data 1210 may be stored in the idle storage area 1202 of the physical units PCA(0) to PCA(20).

Similar to the exemplary embodiment of FIG. 10, the memory management circuit 502 may scan forward from the end of the management data 1210 to find the logical unit related to the data PTE(0) affected by the error. When the mapping information related to the logical unit LCA(8) is detected (the logical unit LCA(8) belongs to the logical units LCA(0) to LCA(1023)), the memory management circuit 502 may stop scanning and determine one reference information area 1220. For example, the reference information area 1220 may cover the mapping information related to the physical units PCA(0) to PCA(18), as shown in FIG. 12. The memory management circuit 502 may partially rebuild the data affected by the error in the host memory buffer 71 according to the information in the reference information area 1220. For related details, please refer to the description of the exemplary embodiment of FIG. 11, which is not repeated herein.

It should be noted that in an exemplary embodiment of FIG. 12, the physical units PCA(0) to PCA(20) may belong to one virtual block 1200. The virtual block 1200 is a virtual block configured to store data from the host system 11 in a past period of time. In an exemplary embodiment, the information related to logical units (i.e., mapping information) stored in the virtual block 1200 may include information updated to the system area 602 of FIG. 6 and information not updated to the system area 602 of FIG. 6. In an exemplary embodiment, the memory management circuit 502 only scans the information in the virtual block 1200 not updated to the system area 602 of FIG. 6.

In an exemplary embodiment, it is assumed that the first data in the host memory buffer 71 is configured to read data from the memory storage apparatus 10. When the error in the first data in the host memory buffer 71 is detected, the partial rebuilding of the data performed by the memory management circuit 502 may include reading the corresponding original data from the system area 602 of FIG. 6 and replacing the data in the host memory buffer 71 affected by the error using the original data according to the data range in the host memory buffer 71 affected by the error. In addition, the data in the host memory buffer 71 not affected by the error may also not be changed.

In an exemplary embodiment, the operation of actively detecting the error in the first data in the host memory buffer 71 by the memory management circuit 502 is not executed in response to a command from the host system 11. For example, the command may include a write command instructing to write data, a read command instructing to read data, and/or an erase command instructing to erase data, and so on. For example, the memory management circuit 502 may actively detect whether there is an error in the first data in the host memory buffer 71 every time a period of time elapsed or a trigger condition inside the memory storage apparatus 10 is met.

In an exemplary embodiment, after the error in the first data in the host memory buffer 71 is detected, the memory management circuit 502 may mark at least one storage area (also referred to as the first storage area) in the host memory buffer 71 according to the error. Before the current connection 701 between the host system 11 and the memory storage apparatus 10 is disconnected (and/or before the connection 701 between the host system 11 and the memory storage apparatus 10 is re-established), the memory management circuit 502 may not use (including prohibiting use or not allowing use) the first storage area marked in the host memory buffer 71 to store data.

In an exemplary embodiment, when the data affected by the error is partially rebuilt in the host memory buffer 71, the memory management circuit 502 may not rebuild (e.g. store) the replacement data (that is, the new data used to partially replace the damaged data) in the marked first storage area. For example, it is assumed that the first data with an error is originally a physical location PA stored in the host memory buffer 71. After an error is detected in the first data, new data configured to partially rebuild or replace the first data may be stored in another physical location PB, and the physical location PA is different from the physical location PB. In this way, it is possible to prevent the error from repeatedly appearing in the rebuilt data in the host memory buffer 71.

In an exemplary embodiment, after the error in the first data in the host memory buffer 71 is detected, the memory management circuit 502 may update the number of errors occurring in the first storage area in the host memory buffer 71, for example, increase the cumulative number of errors occurring in the first storage area by one. If the cumulative number of errors occurring in the first storage area reaches a threshold, the memory management circuit 502 may not use (including prohibiting use or not allowing use) the first storage area in the host memory buffer 71 to store data. In an exemplary embodiment, if the cumulative number of errors occurring in the first storage area does not reach the threshold, the memory management circuit 502 may continuously use the first storage area in the host memory buffer 71 to store data.

In an exemplary embodiment, once the connection 701 between the host system 11 and the memory storage apparatus 10 is re-established, the accumulated number of errors occurring in the first storage area may be reset (for example, reset to zero). In an exemplary embodiment, regardless of whether the connection 701 between the host system 11 and the memory storage apparatus 10 is re-established, the accumulated number of errors occurring in the first storage area may not be reset (for example, reset to zero).

Figure 13:
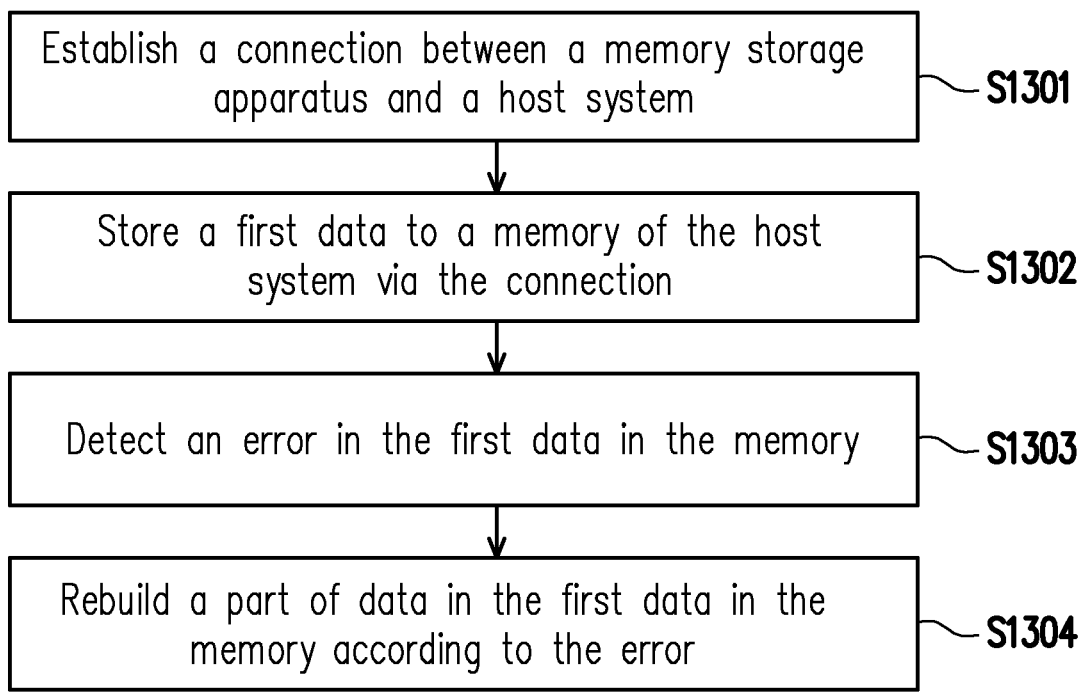
FIG. 13 is a flowchart illustrating a data rebuilding method according to an exemplary embodiment of the invention.

FIG. 13 is a flowchart illustrating a data rebuilding method according to an exemplary embodiment of the invention. Referring to FIG. 13, in step S1301, a connection between a memory storage apparatus and a host system is established. In step S1302, a first data is stored to a memory of the host system via the connection. In step S1303, an error in the first data in the memory is detected. In step S1304, a part of a data in the first data is rebuilt in the memory according to the error.

However, each step in FIG. 13 is as described in detail above, and is not repeated herein. It should be mentioned that, each step in FIG. 13 may be implemented as a plurality of program codes or circuits, and the invention is not limited thereto. Moreover, the method of FIG. 13 may be used with the above exemplary embodiments, and may also be used alone, and the invention is not limited thereto.

Based on the above, in the exemplary embodiments provided by the invention, the memory storage apparatus end may actively detect whether the data in the memory of the host system has an error or not. If an error occurs, the memory storage apparatus end may instantly partially rebuild the data affected by the error in the memory of the host system (not to rebuild all the data in the memory). In this way, the fault tolerance of the memory storage apparatus to the shared memory in the host system may be improved.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A data rebuilding method for a memory storage apparatus, the data rebuilding method comprising:
    establishing a connection between the memory storage apparatus and a host system;
    storing a first data to a memory of the host system via the connection;
    detecting an error in the first data which is currently stored in the memory of the host system by decoding the first data after the first data is stored to the memory of the host system via the connection; and
    correcting the error in the first data and storing a corrected data to the memory of the host system to replace a part of data in the first data which is currently stored in the memory of the host system and infected by the error.

2. The data rebuilding method of claim 1, wherein the step of detecting the error in the first data which is currently stored in the memory of the host system by decoding the first data comprises:
    detecting the error in the first data which is currently stored in the memory of the host system according to a decoding result.

3. The data rebuilding method of claim 1, wherein the step of correcting the error in the first data and storing the corrected data to the memory of the host system comprises:
    reading a management data from the memory storage apparatus, wherein the management data comprises a mapping information reflecting a mapping relationship between at least one logical unit and at least one physical unit;
    determining a reference information area in the mapping information according to a data range affected by the error; and
    rebuilding the part of data in the first data in the memory of the host system according to a mapping information in the reference information area.

4. The data rebuilding method of claim 3, wherein the step of reading the management data from the memory storage apparatus comprises:
    reading the management data from a buffer memory of the memory storage apparatus.

5. The data rebuilding method of claim 3, wherein the step of reading the management data from the memory storage apparatus comprises:
    reading the management data from the at least one physical unit.

6. The data rebuilding method of claim 1, wherein the step of detecting the error in the first data which is currently stored in the memory of the host system is not executed in response to a command from the host system.

7. The data rebuilding method of claim 1, further comprising:
marking a first storage area in the memory of the host system according to the error; and
storing data without using the first storage area before the connection is re-established.

8. The data rebuilding method of claim 1, wherein the connection conforms to a high-speed Peripheral Component Interconnect Express (PCI Express) standard.

9. A memory storage apparatus, comprising:
a connection interface unit configured to be coupled to a host system;
a rewritable non-volatile memory module; and
a memory control circuit unit coupled to the connection interface unit and the rewritable non-volatile memory module,
wherein the memory control circuit unit is configured to establish a connection between the memory storage apparatus and the host system,
the memory control circuit unit is further configured to store a first data to a memory of the host system via the connection,
the memory control circuit unit is further configured to detect an error in the first data which is currently stored in the memory of the host system by decoding the first data after the first data is stored to the memory of the host system via the connection, and
the memory control circuit unit is further configured to correct the error in the first data and store a corrected data to the memory of the host system to replace a part of data in the first data which is currently stored in the memory of the host system and infected by the error.

10. The memory storage apparatus of claim 9, wherein the operation of detecting the error in the first data which is currently stored in the memory of the host system by decoding the first data comprises:
detecting the error in the first data which is currently stored in the memory of the host system according to a decoding result.

11. The memory storage apparatus of claim 9, wherein the operation of correcting the error in the first data and storing the corrected data to the memory of the host system comprises:
reading a management data from the memory storage apparatus, wherein the management data comprises a mapping information reflecting a mapping relationship between at least one logical unit and at least one physical unit;
determining a reference information area in the mapping information according to a data range affected by the error; and
rebuilding the part of data in the first data in the memory of the host system according to a mapping information in the reference information area.

12. The memory storage apparatus of claim 11, wherein the operation of reading the management data from the memory storage apparatus comprises:
reading the management data from a buffer memory of the memory storage apparatus.

13. The memory storage apparatus of claim 11, wherein the operation of reading the management data from the memory storage apparatus comprises:
reading the management data from the at least one physical unit.

14. The memory storage apparatus of claim 9, wherein the operation of detecting the error in the first data which is currently stored in the memory of the host system is not executed in response to a command from the host system.

15. The memory storage apparatus of claim 9, wherein the memory control circuit unit is further configured for:
marking a first storage area in the memory of the host system according to the error; and
storing data without using the first storage area before the connection is re-established.

16. The memory storage apparatus of claim 9, wherein the connection conforms to a high-speed PCI Express standard.

17. A memory control circuit unit configured to control a memory storage apparatus, wherein the memory storage apparatus comprises a rewritable non-volatile memory module, and the memory control circuit unit comprises:
a host interface configured to be coupled to a host system;
a memory interface configured to be coupled to the rewritable non-volatile memory module; and
a memory management circuit coupled to the host interface and the memory interface,
wherein the memory management circuit is configured to establish a connection between the memory storage apparatus and the host system,
the memory management circuit is further configured to store a first data to a memory of the host system via the connection,
the memory management circuit is further configured to detect an error in the first data which is currently stored in the memory of the host system by decoding the first data after the first data is stored to the memory of the host system via the connection, and
the memory management circuit is further configured to correct the error in the first data and store a corrected data to the memory of the host system to replace a part of data in the first data which is currently stored in the memory of the host system and infected by the error.

18. The memory control circuit unit of claim 17, wherein the operation of detecting the error in the first data which is currently stored in the memory of the host system by decoding the first data comprises:
detecting the error in the first data which is currently stored in the memory of the host system according to a decoding result.

19. The memory control circuit unit of claim 17, wherein the operation of correcting the error in the first data and storing the corrected data to the memory of the host system comprises:
reading a management data from the memory storage apparatus, wherein the management data comprises a mapping information reflecting a mapping relationship between at least one logical unit and at least one physical unit;
determining a reference information area in the mapping information according to a data range affected by the error; and
rebuilding the part of data in the first data in the memory of the host system according to an information in the reference information area.

20. The memory control circuit unit of claim 19, wherein the operation of reading the management data from the memory storage apparatus comprises:
reading the management data from a buffer memory of the memory storage apparatus.

21. The memory control circuit unit of claim 19, wherein the operation of reading the management data from the memory storage apparatus comprises:

reading the management data from the at least one physical unit.

22. The memory control circuit unit of claim 17, wherein the operation of detecting the error in the first data which is currently stored in the memory of the host system is not executed in response to a command from the host system.

23. The memory control circuit unit of claim 17, wherein the memory management circuit is further configured for:
   marking a first storage area in the memory of the host system according to the error; and
   storing data without using the first storage area before the connection is re-established.

24. The memory control circuit unit of claim 17, wherein the connection conforms to a high-speed PCI Express standard.

* * * * *